United States Patent [19]

Brewer et al.

[11] 4,329,447

[45] May 11, 1982

[54] CATALYST FOR AND METHOD OF PREPARING CELLULOSE ESTERS

[75] Inventors: Richard J. Brewer; Brice S. Wininger, both of Kingsport, Tenn.

[73] Assignee: Eastman Kodak Company, Rochester, N.Y.

[21] Appl. No.: 182,521

[22] Filed: Aug. 29, 1980

[51] Int. Cl.$^3$ ................................................ C08B 3/06
[52] U.S. Cl. .................................... 536/69; 252/426; 252/428; 536/63
[58] Field of Search .................. 252/426, 428; 536/63, 536/69

[56] References Cited

U.S. PATENT DOCUMENTS

| | | | |
|---|---|---|---|
| 2,827,455 | 3/1958 | Wells et al. | 536/69 |
| 2,861,069 | 11/1958 | Touey et al. | 536/69 |
| 3,976,595 | 8/1976 | Scott et al. | 252/428 |

Primary Examiner—A. Lionel Clingman

Attorney, Agent, or Firm—John F. Stevens; Daniel B. Reece, III

[57] ABSTRACT

Disclosed is a catalyst and a method of preparing lower fatty acid esters of cellulose which comprises esterifying at a temperature of between about 75° C. and about 110° C. a cellulose compound having esterifiable hydroxyl groups with an esterifying bath comprising an organic acid anhydride, a diluent, and a catalyst comprising (a) from about 0.3 to about 3.0% by weight, based on the weight of cellulose, of an acid selected from the group consisting of sulfuric acid, p-toluene sulfonic acid, methane sulfonic acid, methane disulfonic acid and m-benzene disulfonic acid, and (b) from about 0.05 to about 0.3% by weight, based on the weight of cellulose, of a dialkyl phosphite, the alkyl groups of which contain from 2 to 4 carbon atoms, the weight ratio of said bath to the cellulose being between about 5:1 and about 10:1.

6 Claims, No Drawings

CATALYST FOR AND METHOD OF PREPARING CELLULOSE ESTERS

TECHNICAL FIELD

This invention relates to the preparation of lower fatty acid esters of cellulose in which certain sulfur-containing acids and an alkyl phosphite are used as esterification catalysts.

BACKGROUND ART

In the usual preparation of lower fatty acid esters of cellulose, sulfuric acid is the catalyst employed. This acid is very effective in that it promotes esterification of the cellulose under relatively mild conditions but it has the disadvantage in that it combines with cellulose and the cellulose ester obtained often contains sulfur acid radicals. Ordinarily these sulfate groups can be removed from the final product by a prolonged hydrolysis under very carefully controlled conditions. However, even after this treatment, the product may contain sufficient combined sulfuric acid to render it unstable to prolonged heating at elevated temperatures such as may be encountered in molding operations or the like.

In order to eliminate this disadvantage which may be encountered when sulfuric acid catalyst is employed, various so-called "non-combining" acids have been suggested as catalysts in cellulose esterification processes. Perchloric acid is an example of such an acid catalyst. However, perchloric acid has several disadvantages when used as a catalyst. For instance it is corrosive on stainless steel equipment. It is explosive in contact with readily oxidizable materials.

According to U.S. Pat. No. 2,861,069, other strong acid catalysts such as phosphoric acid, hydrochloric acid, methane sulfonic acid, toluene sulfonic acid and the like have also been disclosed as useful noncombining catalysts in the esterification of cellulose. In addition, weak salts of strong acids such as zinc chloride.

According to the article "Catalysts for Acetylation of Cellulose" (Industrial and Engineering Chemistry, May, 1961, page 363) certain sulfonic acids have been known as catalysts for the acetylation of cellulose. There is no disclosure, however, that by using abnormally low concentrations of catalysts, high reaction temperatures may be endured.

Commercial cellulose esterifications, for the most part, are consequently conducted using relatively large quantities of sulfuric acid as the reaction catalyst. Sulfuric acid is a very strong acid catalyst for cellulose esterification and requires considerable reaction temperature manipulation (cooling) in order to avoid excessive degradation (reduction) of the cellulose molecular weight. Sulfuric acid also combines with the cellulose during esterification to form a cellulose sulfate ester which decreases the thermal stability of the cellulose organic ester. Other cellulose esterification catalysts such as perchloric acid, hydrochloric acid, and zinc chloride are well known in the art as noncombining catalysts. However, these catalysts are either too corrosive (perchloric and hydrochloric acid) or too much (50 to 100% based on weight of cellulose) is required for efficient reaction (zinc chloride).

Certain sulfonic acids, e.g., para-toluene sulfonic acid, also are known in the art as cellulose esterification catalysts but again large amounts (up to 50 wt. % based on cellulose) of catalyst have been considered necessary at the normal reaction temperature (40°-50° C.) and high quality, high α-cellulose content pulps are required to obtain an acceptable quality product.

The present invention is believed to be the first realization that very small amounts of catalysts comprising sulfur-containing acids and dialkyl phosphite may be used at reaction temperatures of 75°-110° C. to obtain acceptable quality cellulose acetate from low α-cellulose (e.g., viscose grade) wood pulps.

DISCLOSURE OF INVENTION

The present invention provides a catalyst composition and method of preparing lower fatty acid esters of cellulose which comprises esterifying at a temperature of between about 75° C. and about 110° C. (preferably about 85°-95° C.) a cellulose compound having esterifiable hydroxyl groups with an esterifying bath comprising an organic acid anhydride, a diluent, and a catalyst. The catalyst comprises (a) from about 0.3% to about 3.0% by weight (preferably about 0.5-1.0%), based on the weight of cellulose, of an acid selected from the group consisting of sulfuric acid, p-toluene sulfonic acid, methane sulfonic acid, methane disulfonic acid and m-benzene disulfonic acid, and (b) from about 0.05 to about 0.3% by weight (preferably from about 0.10 to about 0.20%) based on the weight of cellulose, of a dialkyl phosphite, the alkyl groups of which each have from 2 to 4 carbon atoms. The weight ratio of the bath of the cellulose is between about 5:1 to about 10:1. Use of small amounts of catalyst and relatively high esterification temperatures are found to be especially advantageous.

BEST MODE FOR CARRYING OUT THE INVENTION

According to the present invention, small amounts of sulfur-containing acids catalyst blended with a dialkyl phosphite are used in the esterification of cellulose allowing the reaction temperature to rise to between about 75° C. and about 110° C. Such reaction temperatures are advantageous, because as the exothermic reaction causes a rise in temperature, less cooling is required than in processes where the reaction temperature must be lowered a great amount.

The catalysts used in accordance with the present invention are sulfuric acids, namely I p-toluene sulfonic acid (pTSA)

II methane sulfonic acid (MeSA)

III methane disulfonic acid (MeDSA)

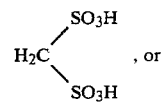, or

IV m-benzene disulfonic acid (m-BDSA)

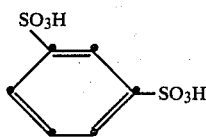

V sulfuric acid ($H_2SO_4$).

These sulfur-containing acid catalysts are used in amounts of from about 0.3% to about 3.0%, based on the weight of cellulose. Preferably, about 0.5% to about 1.0%, based on the weight of cellulose, is used.

The dialkyl phosphite (or mixture thereof) is used in amounts of from about 0.05 to about 0.3%, based on the weight of cellulose. Preferably, about 0.10 to about 0.20%, based on the weight of cellulose is used. The catalyst blend, therefore, comprises from about 1 to about 60 parts of at least one sulfur-containing acid and about 1 part of the dialkyl phosphite.

The addition of at least one dialkyl phosphite to the selected sulfur-containing acid for high temperature acetylation provides a more controllable, reproducible, smoother acetylation reaction with improved (less) product color and better retention of product viscosity during the high temperature processes. The dialkyl phosphite may be added to the cellulose prior to or simultaneously with the acid and it is preferred to pretreat the cellulose with this catalyst mixture 20-30 minutes at 25°-30° C. prior to the high temperature acetylation reaction. Such a pretreatment process ensures uniform distribution of the catalyst mixture throughout the cellulose polymer.

The high temperature acetylation process with sulfur-containing acid/dialkyl phosphite catalyst allows a lower liquid/cellulose ratio during reaction compared to the conventional process thus enabling considerable savings in liquid raw materials and recovery energy. Normally, the liquid/cellulose ratio may be reduced from about 7.0-8.5:1 to about 5.5-6:1.

Although the process according to this invention is especially useful in the acetylation of low α-cellulose, such as viscose grade cellulose wood pulp, it may be used in the acetylation of any of the conventional types of cellulose.

The catalysts in accordance with the invention are also useful in esterification processes which involve the esterification of cellulose compounds containing free and esterifiable hydroxyl groups. For instance, partially substituted cellulose esters or cellulose ethers can be esterified by lower fatty acid anhydrides and the reaction catalyzed as described herein. Some cellulose esters to the preparation of which the use of catalysts described herein is particularly adapted are cellulose acetate propionate, cellulose acetate butyrate, cellulose propionate and cellulose butyrate.

In the acetylation process as practiced in this invention, the cellulose wood pulp is esterified in a mixture of acetic and/or butyric acid (preferably about 2 to 3 parts per part of cellulose); and lower fatty acid anhydride (about 3 parts) resulting in about 5-6 parts total liquid per part of cellulose, and using the catalyst system described herein. Although it is preferred that the liquid bath/cellulose ratio be about 5 or 6 to 1, larger amounts of liquid bath may sometimes be used to increase this ratio up to about 10 to 1. The reaction is carried out at temperatures from 75° to 100° C. (85°–95° C. preferred) until a grain-free, smooth reaction solution is obtained. Sufficient aqueous acetic acid may be added to destroy the excess acetic anhydride and to provide water in the reaction solution for hydrolysis which is carried out at about 100° C. until the desired acetyl content is obtained on the cellulose acetate. In the preferred process, one-half of the sulfonic acid catalyst is neutralized with sodium acetate prior to hydrolysis at about 100° C. The cellulose acetate, after hydrolysis, is precipitated, washed, stabilized, and dried according to methods well known in the art.

In the high temperature acetylation process as described in this invention, the cellulose pulp does not require any special activation with water, aqueous acetic acid, or acid catalyst in order to achieve adequate reactivity. It is to be understood that the process of this invention is applicable to high quality, high α-cellulose content wood pulps, but is especially useful in connection with low α-cellulose pulps as described in the examples cited herein.

The following examples are submitted for a better understanding of the invention. Conventional esterification techniques are used with the catalysts according to this invention as described above.

| Example | Catalyst Type | Wt. %[a] | Phosphite Type | Wt. %[a] | Reaction Temp. °C. | Reaction Time, Min | Acetyl[b] Wt. % | Intrinsic Viscosity |
|---|---|---|---|---|---|---|---|---|
| 1 | $H_2SO_4$ | 0.5 | Diethyl | 0.2 | 91° | 25 | 39.5 | 1.42 |
| 2 | MeDSA | 0.5 | Diethyl | 0.2 | 96° | 35 | 39.0 | 1.18 |
| 3 | $H_2SO_4$ | 0.3 | Diisopropyl | 0.2 | 94° | 40 | 39.3 | 1.35 |
| 4 | MeDSA | 0.4 | Triethyl | 0.2 | 93° | 55 | 39.6 | 1.57 |
| 5 | $H_2SO_4$ | 0.25 | Triethyl | 0.2 | 94° | 55 | 39.3 | 1.20 |

[a] Amount Based on Weight of Cellulose.
[b] After 8 Hrs. Hydrolysis at 102 ± 1° C.

Inherent viscosity (I.V.) is measured by dissolving 0.25 g. of cellulose ester in 100 ml. of acetone solvent at 25°±0.1° C.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

We claim:

1. A method of preparing lower fatty acid esters of cellulose which comprises esterifying at a temperature of between about 75° C. and about 110° C. a cellulose compound having esterifiable hydroxyl groups with an esterifying bath comprising an organic acid anhydride, a diluent, and a catalyst comprising (a) from about 0.3 to about 3.0% by weight, based on the weight of cellulose, of an acid selected from the group consisting of sulfuric acid, p-toluene sulfonic acid, methane sulfonic acid, methane disulfonic acid and m-benzene disulfonic acid, and (b) from about 0.05 to about 0.3% by weight, based on the weight of cellulose, of a dialkyl phosphite, the alkyl groups of which contain from 2 to 4 carbon atoms, the weight ratio of said bath to the cellulose being between about 5:1 and about 10:1.

2. A method according to claim 1 wherein the esterification is carried out at a temperature of about 85°–95° C.

3. A method according to claim 1 wherein said acid is present in an amount of from about 0.5–1.0%, based on the weight of cellulose and said dialkyl phosphite is present in an amount of about 0.10–0.20%, based on the weight of cellulose.

4. A method according to claim 1 wherein the weight ratio of said bath to said cellulose is between about 5:1 and about 6:1.

5. A method according to claim 1 wherein the ester of cellulose is acetate.

6. A method of preparing lower fatty acid esters of cellulose which comprises esterifying at a temperature of between about 85° C. and about 95° C. a cellulose compound having esterifiable hydroxyl groups with an esterifying bath comprising an organic acid anhydride, a diluent, and a catalyst comprising (a) from about 0.5 to about 1.0 by weight, based on the weight of cellulose, of an acid selected from the group consisting of sulfuric acid, p-toluene sulfonic acid, methane sulfonic acid, methane disulfonic acid and m-benzene disulfonic acid, and (b) from about 0.10 to about 0.20 by weight, based on the weight of cellulose, of a dialkyl phosphite, the alkyl groups of which contain from 2 to 4 carbon atoms, the weight ratio of said bath to the cellulose being between about 5:1 and about 10:1.

* * * * *